Nov. 17, 1964  T. F. SWANSON  3,157,094
METHOD AND APPARATUS FOR CUTTING A BEARING SURFACE
IN HOLLOW CORED ROLL OF TOWELING
Filed May 22, 1961  2 Sheets-Sheet 1
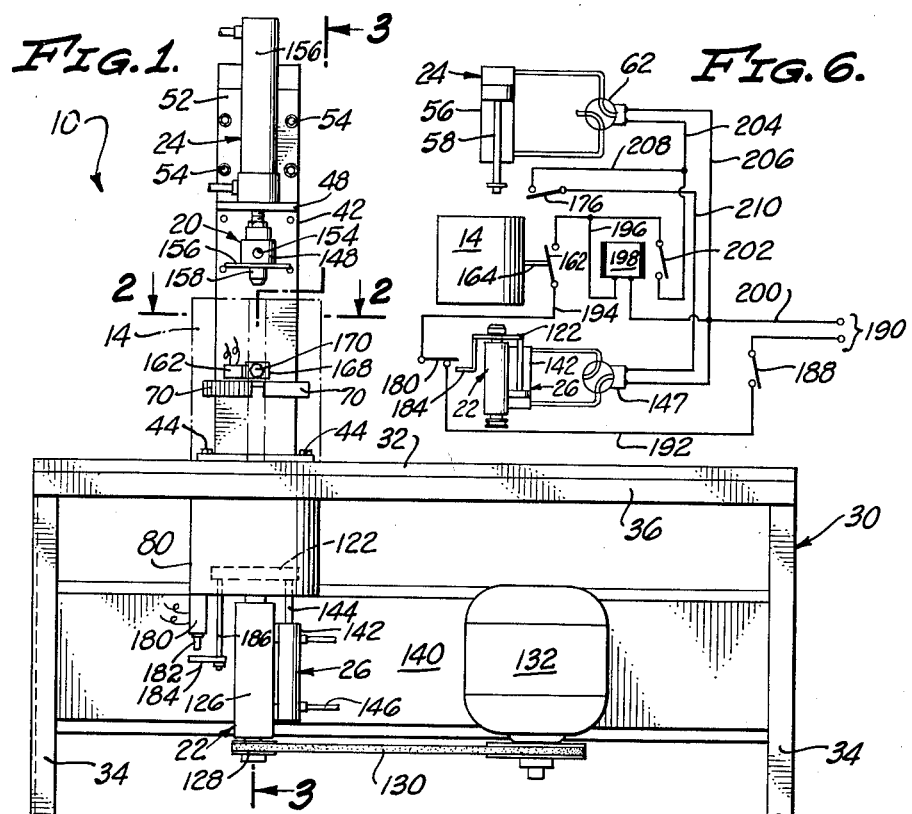
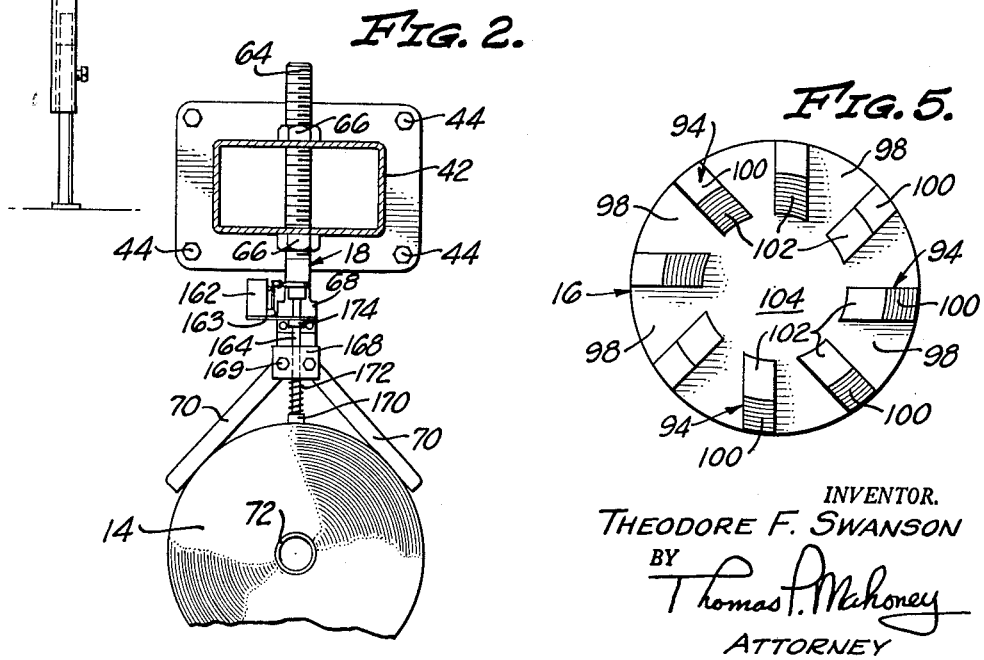
INVENTOR.
THEODORE F. SWANSON
BY
Thomas P. Mahoney
ATTORNEY

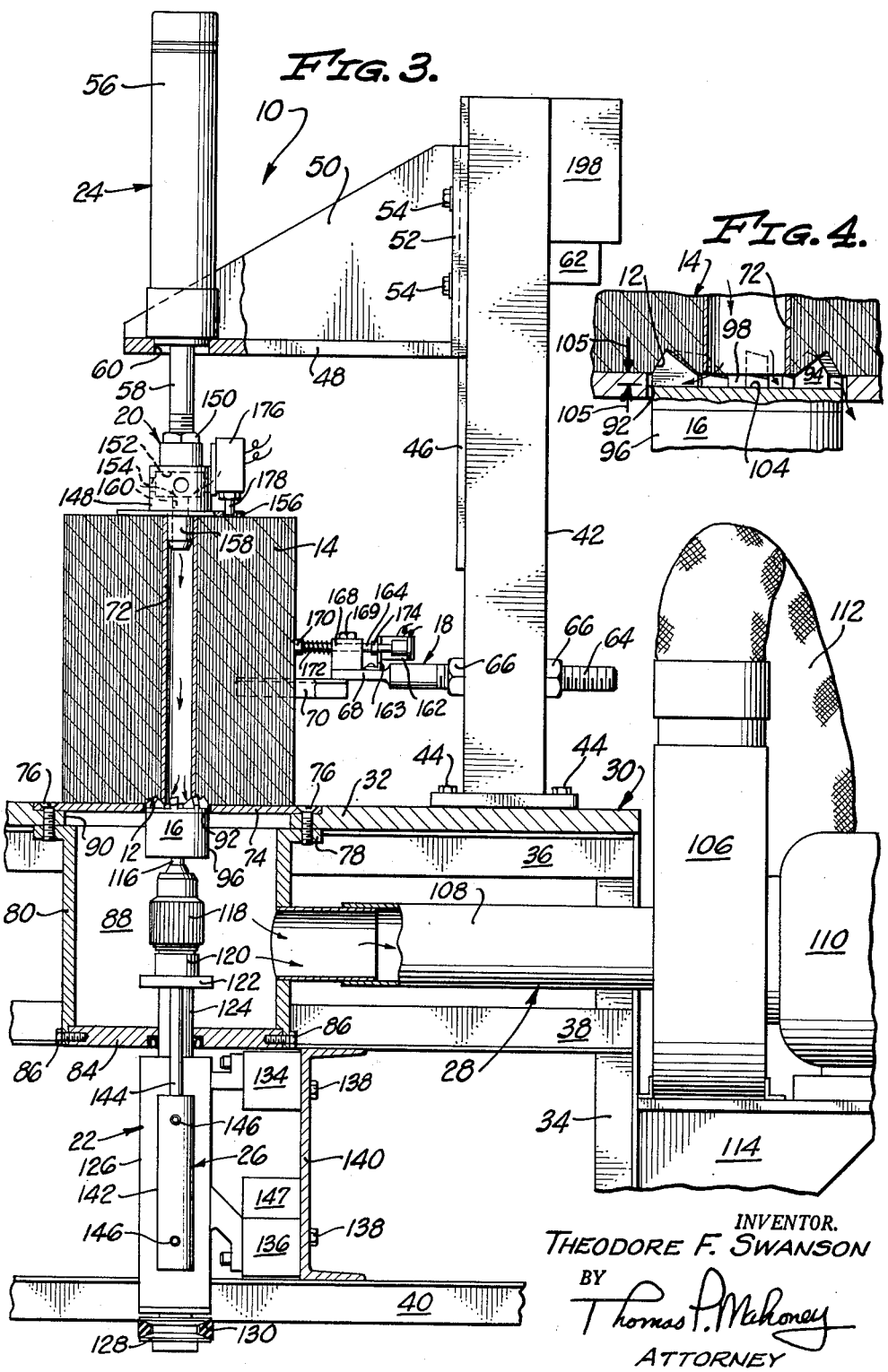

United States Patent Office 3,157,094
Patented Nov. 17, 1964

3,157,094
METHOD AND APPARATUS FOR CUTTING A BEARING SURFACE IN HOLLOW CORED ROLL OF TOWELING
Theodore F. Swanson, La Habra, Calif., assignor to Towlsaver, Inc., Los Angeles, Calif., a corporation of California
Filed May 22, 1961, Ser. No. 111,731
5 Claims. (Cl. 90—14)

The present invention relates to a method and apparatus for cutting a bearing surface in an end of hollow cored roll of toweling and, more particularly, to such an apparatus which includes means for rapidly transporting the toweling cuttings away from the cutter.

As more particularly described in co-pending application, Serial No. 708,109, filed January 10, 1958; now Patent No. 3,029,035, and entitled "Roll Supporting Construction," it is desirable to employ hollow cored rolls of toweling which have been grooved at one end to provide integral bearing surfaces therein. The formation of such a bearing groove in rolls of paper toweling has heretofore posed a problem in that the toweling cuttings tend to collect upon and adhere to the cutter. That is, the nature of paper toweling is such that when it is cut at high speeds the cuttings gum up, collect on the cutter teeth, and spoil the cutting action of the cutter in addition to ruining the toweling.

While the method and apparatus are disclosed as utilized in cutting grooves in paper toweling, such grooves may be formed in paper tissue and the like and it is not intended to restrict the practice of the invention to paper toweling.

It is, therefore, an object of the present invention to provide a unique apparatus for cutting an annular opening in an end of a hollow cored roll of toweling while simultaneously urging air through the hollow core and through open channels provided in the cutter to thereby evacuate toweling cuttings away from the cutter, and also cool the cutter.

It is another object of the present invention to provide apparatus of the above-described character which employs a rotary cutter which is discontinuous in its plane of rotation to provide open channels through which air can be urged to carry toweling cuttings away from the cutting edges or teeth of the cutter.

It is a further object of the invention to provide an apparatus of the above-described character wherein a support is provided for the roll, and a rotary cutter is operative through an opening in the support for cutting a groove in one end of the toweling. The relative size of the opening and the cutter are such that the cutter is spaced from the edge margins of the opening to define a clearance space therewith, and, in addition, the cutter incorporates open channels which afford communication between the hollow core of the roll of toweling and the opening, and air is drawn through the hollow core, the open channels, and the opening by a suction-type air blower to thereby evacuate toweling cuttings away from the cutter.

It is also an object of the invention to provide an apparatus of the character described which includes a rotary cutter having a plurality of circumferentially spaced cutter teeth and a cutter support for the cutter teeth, the plurality of teeth having a depth which is greater than the predetermined depth of the groove to be cut so that there is defined at all times a space between the cutter support and the roll of toweling. In this way, air can be drawn through the hollow core and the spaces defined by the roll base, the cutter support, and adjacent teeth to thereby transport toweling cuttings away from the cutter.

It is a further object of the invention to provide an apparatus of the character described in which the roll of toweling is supported above an enclosure within which a rotary cutter is located, the rotary cutter being disposable through an opening in the enclosure to engage the roll. A blower means is coupled to the interior of the enclosure to withdraw air from the chamber within the enclosure, thereby drawing air through the hollow core of the roll of toweling, through the cutter, through the opening in the enclosure, and to the blower means, whereby toweling cuttings may be transported away from the cutter.

It is another object of the invention to provide an apparatus of the character described in which a rotary cutter is employed which includes specially formed teeth affording passages for air whereby air may be urged through the hollow core of the roll of toweling and pass the cutter teeth to evacuate toweling cuttings away from the cutter teeth.

It is a further object of the invention to provide an apparatus of the character described which includes a rotary cutter having a plurality of radially arranged teeth which are spaced apart at their inner extremities to define an open central area so that air may be drawn through the hollow core of the roll of toweling and, thence, through this open central area for evacuation of the toweling cuttings.

It is an additional object of the invention to provide an apparatus of the character described wherein the formation of the annular opening in one end of the toweling is semi-automatic and, more particularly, wherein the roll of toweling is locatable in a predetermined position upon a support having an opening through which a rotary cutter is urgable for engagement with one end of the roll of toweling. The locating of the roll of toweling in the predetermined position is effective to actuate switch means for moving a roll holder into engagement with the end of the toweling roll opposite the end which is to be cut. The roll holder also carries switch means which are actuable upon engagement of the roll holder with the roll to move the rotary cutting means through the opening in the support for the roll of toweling to form the desired annular groove in the roll.

The apparatus also includes further switch means which are operative upon the completion of the formation of the toweling groove to render inoperative the roll holder so that the roll may be removed from said predetermined position. In one embodiment of the present invention, the roll holder includes a ported element which is receivable within the hollow core of the roll to precisely locate the roll in said predetermined position, the element being ported so that air may be withdrawn through the ports of the element in its passage through the hollow core of the roll of toweling and past the cutting edges of the rotary cutter for evacuation of the toweling cuttings.

It is another object of the invention to provide an apparatus of the character described wherein the cutting of the groove in one end of the roll of toweling is substantially automatic, the placement of the roll of toweling in a predetermined position for cutting being the only operation which is required of an attendant or operator. The removal of the roll of toweling from said predetermined position is, in one embodiment of the invention, accomplished by a spring-biased ejector element, the operator of the apparatus thereafter accomplishing the final removal of the roll for placement of another roll in position for cutting.

It is also an object of the invention to provide an apparatus of the above-described character which is relatively inexpensive to manufacture and simple to operate, and accomplishes the cutting operation substantially automatically.

Other objects and features of the invention will become apparent from consideration of the following description taken in connection with the accompanying drawings, in which:

FIG. 1 is a front elevational view of the apparatus of the present invention, certain of the components thereof being omitted for convenience of illustration, particularly a portion of the frame and portions of the pneumatic apparatus;

FIG. 2 is a plan view, partially in cross section, taken from line 2—2 of FIG. 1;

FIG. 3 is a side elevational view of the apparatus, partially in cross section, taken from line 3—3 of FIG. 1;

FIG. 4 is a detail side elevational view, in cross section, of the rotary cutter and the base of the roll of toweling;

FIG. 5 is a plan view of the rotary cutter; and

FIG. 6 is a schematic diagram illustrating the circuitry and pneumatic lines which are operable to provide semi-automatic operation of the present apparatus.

Referring to the drawings, and particularly FIGS. 1 through 3, there is illustrated an apparatus 10 for cutting an annular groove 12 in an end of a hollow cored roll of toweling 14. As will become apparent hereinafter, the apparatus 10 is effective to cut the groove 12 while simultaneously evacuating or removing the toweling cuttings before such cuttings have an opportunity to collect and gum up the cutting edges of the cutter.

The apparatus 10 comprises a rotary cutter 16 for cutting the groove 12 in the toweling roll 14; a locating assembly 18 to locate the toweling roll 14 in a predetermined position for cutting; a roll holder assembly 20 for holding the roll 14 in said predetermined position; a drive assembly 22 for rotating the cutter 16; a positioning assembly 24 for urging the roll holder assembly 20 into engagement with the roll 14; a cutter locating assembly 26 for urging the cutter 16 into engagement with the toweling roll 14; an air evacuating assembly 28 for removing toweling cuttings from the cutting area; and a frame 30 for supporting the various components of the present apparatus 10 in co-operative and operating relationship.

The frame 30 includes a horizontally disposed support or bed 32 which is generally rectangular in form, and which is supported above the floor by a plurality of vertically disposed, upstanding legs 34. The support 32 is held in position by a plurality of angles 36 which are secured at their ends to the various legs 34. In addition, a plurality of similar angles 38, FIG. 3, are horizontally disposed beneath the angles 36 and connected at their ends to the legs 34 in spaced relationship with the angles 36 to brace the legs 34. An additional plurality of angles 40 are horizontally disposed beneath the angles 38 and are secured at their ends to the legs 34 to further brace the legs 34 and mount certain of the components of the apparatus 10, as will be seen hereinbelow.

The frame 30 also includes a vertically disposed supporting column 42 secured at its base to the bed 32 by a plurality of bolts 44. The forward face of the column 42 is provided with grooved or slotted ways 46 which support a cantilevered plate 48 for slidable, vertical movement upon the column 42. More particularly, the plate 48 extends forwardly from the column 42 and includes a substantially triangular-formed web 50 connected to an integral rearward plate 52 which is vertically slidable upon the ways 46, but which is normally maintained in fixed position by a plurality of bolts 54 which are disposed through the rearward plate 52 and threaded into fittings (not shown) which are slidable within the slotted ways 46. With this construction, as will be seen, the positioning assembly 24 may be located at various distances above the support 32 for accommodating toweling rolls 14 of various heights.

The positioning assembly 24 is rigidly secured to the horizontally disposed plate 48, and is constituted by a fluid actuated cylinder 56 which slidably houses a piston (not shown) connected to a piston rod 58 vertically slidable through a suitable opening 60 in the horizontally disposed plate 48.

The cylinder 56 is actuated by admitting fluid under pressure, such as air or hydraulic fluid, from a suitable source (not shown), the admission of such fluid under pressure being controlled by a usual and conventional solenoid valve 62 which is conveniently carried at the upper extremity of the column 42. The particular form of solenoid valve is not important to the present invention, and is shown schematically in FIG. 6, it being apparent that any form of solenoid valve which is electrically energizable to route fluid to or from the cylinder 56 is satisfactory for use with the present apparatus 10. The operation of the solenoid valve 62, in conjunction with the cylinder 56 of the positioning assembly 24, will be described in detail hereinafter.

The supporting column 42 of the frame 30 also mounts the roll locating assembly 18, which includes a horizontally disposed locator stud 64, a pair of nuts 66 being threaded upon the locater stud 64 adjacent the forward and rearward faces of the supporting column 42 to secure the locater stud 64 in position upon the supporting column 42. The forward extremity of the locater stud 64 is welded or otherwise rigidly secured to a switch support platform 68, the forward extremity of the support platform 68, in turn, being rigidly secured, as by welding, to a bifurcated locater 70 which is constituted by a pair of forwardly diverging arms adapted to receive and engage the periphery of toweling roll 14.

As will be apparent, the nuts 66 may be loosened and adjusted to position the locater assembly 18 closer to or farther from the rotary cutter 16, depending upon the diameter of the toweling roll 14 which is to be grooved. The engagement of the toweling roll 14 by the locater 70 of the roll locater assembly 18 is an initial step in the operation of providing a groove in one end of the toweling roll 14, as will become more apparent hereinafter.

The toweling roll 14 is of that type conventionally used in towel dispensers, and is formed by wrapping a length of paper toweling about a hollow, tubular, elongated cardboard core 72. The wrapped paper can be cut, but the cuttings therefrom ordinarily tend to mat together or gum in a mass which undesirably clogs the cutting edges of the cutter 16. However, in the present apparatus 10, the hollow core 72 is employed as an air duct through which air is drawn past the cutter 16 to carry away the toweling cuttings, and also cool the cutter 16.

In order to form the groove 12 in the toweling roll 14, the roll 14 is first placed upon the roll support plate 74 which forms a part of the bed 32, and which is secured to the bed 32 by a plurality of screws 76. The screws 76 are threaded at their lower extremities into suitable openings of a radial flange 78 which is integral with a vertically extending and cylindrical enclosure 80 whose lower open end is closed by a closure member 84, a plurality of bolts 86 being horizontally and radially disposed about the periphery of the enclosure 80 and threaded into suitable openings in the closure member 84 to hold it in position.

The enclosure 80, the closure member 84, and the roll support plate 74 together define an evacuation chamber 88 which is in communication with the hollow interior of the core 72 through an opening 90 provided in the bed 32 and an opening 92 provided in the roll support plate 74, it being noted that the opening 92 is of greater diameter than the diameter of the cutter 16 so that an annular clearance or air passage is provided therebetween. It is noted, also, that the support plate 74 is easily removable, by removing the screws 76, to facilitate the substitution of other support plates 74 having different sizes of openings 92 to accommodate different sizes of cutters 16 to cut larger or smaller grooves 12 in different sizes of toweling rolls 14.

The rotary cutter 16, which is rotatable within the evacuation chamber 88 and operative through the openings 90 and 92 to engage the lower end of the roll 14, is constituted by a plurality of cutter teeth 94, FIGS. 4 and 5, which are circumferentially spaced about the periphery of the cutter support 96 to provide a plurality of open channels 98 therebetween. Stated another way, the cutter 16 is discontinuous in its plane of rotation to provide the open channels 98.

As best seen in FIG. 5, the trailing face of each of the teeth 94 is substantially radially aligned with the vertical axis of the cutter support 96, and each of the teeth 94 includes a pair of upper faces 100 and 102 which slope, respectively, from the radially outward and inward extremities of the tooth upwardly and toward each other for cutting the groove 12 in an inverted, V-shaped configuration. Each of the teeth 94 has its faces 100 and 102 rearwardly inclined away from the leading cutting edge to provide clearance angles for efficient removal of toweling cuttings, it being noted that the inner extremities of the teeth 94 are spaced apart to define an open central area 104 through which air may be drawn to aid in evacuating toweling cuttings. In addition, the depth of each of the teeth 94, that is, the vertical distance between the apex formed by the faces 100 and 102 and the base of the tooth at the surface of the cutter support 96, is made greater than the predetermined depth of the groove 12 so as to define at all times a space between the upper surface of the cutter support 96 and the bottom surface of the roll 14. For reference purposes this space is indicated in FIG. 4 by the arrows 105—105. With this arrangement and construction of the teeth 94, it will be apparent that air passages are provided that are in communication with each other for the evacuation of toweling cuttings, air being drawn through the hollow central core of the roll 14, through the open central area 104, through the open channels 98, through the openings 90 and 92, and, thence, into the evacuation chamber 88.

The evacuation chamber 88 is connected to a suitable centrifugal air blower 106 by a horizontally disposed air conduit 108, the blower 106 and the conduit 108 constituting portions of the air evacuating assembly 28, which also includes an electric motor 110 operative to rotate the blower 106 and evacuate toweling cuttings from the evacuation chamber 88, through the conduit 108 and the blower 106, and into a collection bag 112 which is connected to the blower 106. The blower 106 and the motor 110 are conveniently mounted on a motor-blower platform 114 which is secured to one of the legs 34 of the frame 30. The particular form of air blower 106 and motor 110 is not important to the present invention and will not be described in further detail.

The rotary cutter 16 comprises a stub shaft 116 integral with the cutter support 96, FIG. 3, secured within a holding fixture such as the collet of a usual Jacobs chuck 118 which is rotatably supported at its lower end within a bearing block 120. The bearing block 120 is secured to a horizontally disposed support plate 122, and the drive shaft for the Jacobs chuck 118 is rotatably disposed through the bearing block 120, the support plate 122, and through a cylindrical upper extension 124 of a cylindrical and depending bearing sleeve 126 forming a part of the drive assembly 22. The Jacobs chuck drive shaft (not shown) is rotatably carried within the bearing sleeve 126 and is provided at its lower end with a drive pulley 128 rotatable through suitable belting 130 by a conventional drive motor 132, FIG. 1.

Although not illustrated, the drive shaft for the Jacobs chuck 118 is constituted by a pair of drive shaft sections which are splined at their adjacent extremities to constrain the shaft sections against relative rotation, the splines being elongated sufficiently so that the support plate 122, the bearing block 120, the Jacobs chuck 118, and the cutter support 96 are vertically movable while the extension 124 and the bearing sleeve 126 remain fixed in position. These latter components are fixed in position by securement of the bearing sleeve 126 to a pair of brackets 134 and 136 which are secured by a plurality of bolts 138 disposed through a vertically arranged channel 140 and threaded into the brackets 134 and 136. The channel 140 extends transversely of the frame 30 and is secured at its ends to the legs 34, the channel 140 also being secured at its upper and lower flanges to the angles 38 and 40, as by welding.

The cutter locating assembly 26, which is operative to move the rotary cutter 16 upwardly and downwardly, is constituted by a fluid actuated cylinder 142 which vertically and slidably houses a piston (not shown) which is connected to a piston rod 144, the rod 144 being secured at its upper extremity to the support plate 122. The cylinder 142, similarly to the cylinder 56, may be either pneumatically or hydraulically operated through fluid conduits 146 which are connected through a solenoid valve 147 to the source of fluid under pressure. The solenoid valve 147, which is mounted to bracket 136, is, like the solenoid valve 62, a usual and conventional solenoid valve electrically energizable to route fluid to or from the cylinder 142, and the details of the valve will not, therefore, be set forth herein. With this arrangement, the cutter locating assembly 26 may be operated to raise the rotary cutter 16 into cutting engagement with the lower end of the roll 14.

After the toweling roll 14 has been placed in the predetermined position illustrated in FIG. 3, the roll 14 is held in position for cutting by the roll holder assembly 20, which is constituted by a plate support block 148 which is threaded upon the lower end of the piston rod 58 of the positioning assembly 24, and maintained in this position by a lock nut 150. The block 148 includes an internal chamber 152 which opens to the outside of the block 148 through a plurality of ports or passages 154. A circular plate 156 is horizontally disposed beneath and secured to the underside of the block 148, and is adapted to bear upon the upper surface of the toweling roll 14. The plate 156 includes a depending element or centering boss 158 which is provided with a vertically disposed ported passage or channel 160 in communication with the interior of the chamber 152, whereby air may be drawn though the passages 154, the chamber 152, and the channel 160 of the centering element 158. As will be apparent, the element 158 is disposable within the upper end of the hollow core 72 of the roll 14 to center the roll 14 in the desired predetermined position, and the plate 156 holds the roll 14 against the roll support plate 74 during the cutting operation.

Various switches are associated with the components of the present apparatus 10 as follows: there is a switch 162, FIGS. 1, 2, and 3, which is suitably mounted to a bracket 163 bolted to the switch support platform 68 of the locating assembly 18. The switch 162 is normally open, and is closed by inward movement of the rearward end of a horizontally slidable plunger 164, which is horizontally and slidably mounted to a plunger bracket 168. The bracket 168 is suitably secured, as by bolts 169, to the switch support platform 68. An end 170 of the plunger 164 is biased outwardly or forwardly, away from the switch 162, by a compression spring 172 whose ends act against the end 170 and against the forward face of the plunger bracket 168. The extent of outward slidable movement of the plunger 164 is limited by an integral stop 174 formed upon the plunger 164 and engageable with the rear face of the plunger bracket 168.

It will be apparent that placement of the toweling roll 14 in the predetermined position for cutting by the rotary cutter 16 will move the plunger 164 inwardly or rearwardly against the bias of the spring 172 to thereby actuate the switch 162 to operate the solenoid valve 62, as will be seen.

A second switch 176 is carried by the roll holder assembly 20, being mounted to the plate support block 148 thereof. The switch 176 is normally open, and includes a switch plunger 178 which depends through an opening in the circular plate 156 for contact or engagement with the upper surface of the toweling roll 14 when the toweling roll 14 is in the predetermined position for cutting by the rotary cutter 16. The switch 176 is actuated upon downward movement of the roll holder assembly 20 and contact of the circular plate 156 thereof with the toweling roll 14, the actuation of the switch 176 serving to operate the solenoid valve 147, as will be described in greater detail hereinafter.

A third switch 180, FIG. 1, is secured to the underside of the enclosure 80, and includes a depending plunger element 182 engageable by a tab 184 which extends horizontally and is connected at one end to a vertically extending rod 186 secured at its upper end to the support plate 122. When the support plate 122 is moved upwardly by operation of the cutter locating assembly 26, the tab 184 will also move upwardly, and engage the plunger element 182, to thereby actuate the switch 180 when the rotary cutter 16 has moved upwardly the distance necessary to cut the groove 12 in the toweling roll 14 to the proper depth. That is, only when the rotary cutter 16 has completed its formation of the groove 12 will the switch 180 be actuated, and, as will be seen, since the switch 180 is in electrical circuit with the solenoid valves 62 and 147, the solenoids of the valves are then de-energized, and the positioning assembly 24 and the cutter locating assembly 26 operate to move the roll holder assembly 20 and the rotary cutter 16, respectively, away from the toweling roll 14.

Referring to FIG. 6, the present apparatus 10 is operated by first manually closing a line switch 188 to provide current to the system from a source of electrical energy 190. Next, the toweling roll 14 is placed in the predetermined position for cutting, and this causes the plunger 164 to be urged rearwardly to actuate the switch 162 carried by the locator assembly 18. This closure of the switch 162 completes an electrical circuit from the switch 188, through a lead 192, through the normally closed switch 180, through a lead 194, through the switch 162, and through a lead 196 to a relay 198, and, thence, back to the other side of the line source 190 through a lead 200. Energization of the relay 198 closes a normally open switch 202 to supply current to the solenoid valve 62, through a lead 204, and a lead 206 which is connected to the other side of the line source 190.

Thus, it will be apparent that once the toweling roll 14 has been placed in the desired position for cutting, the switch 162 connects a source of electrical energy to the solenoid valve 62, and this, in turn, will cause the cylinder 56 of the positioning assembly 24 to move downwardly and position the circular plate 156 of the roll holder assembly 20 in position upon the upper surface of the toweling roll 14. This holds the roll 14 against the roll support plate 74 to facilitate formation of the groove 12, it being noted that the ported element 158 is at this time disposed within the upper end of the hollow core 72 of the towelling roll 14 to center the roll 14 in position.

Upon engagement of the circular plate 156 with the toweling roll 14, the switch 176 is actuated to thereby supply current from the lead 204, through a lead 208 and a lead 210, to the solenoid valve 147, the solenoid valve 147 being connected to the other side of the line source 190 by the lead 200.

Operation of the solenoid valve 147 routes fluid under pressure to the cylinder 142 of the cutter locating assembly 26, causing upward movement of the support plate 122 and the rotary cutter 16. Movement of the rotary cutter 16 continues upwardly until the full depth of the groove 12 has been formed, at which time the tab 184, FIG. 1, actuates the normally closed switch 180.

As will be apparent in FIG. 6, the switch 180 is in electrical circuit with the solenoid valves 62 and 147, and actuation of the switch 180 opens such circuit, and the current through the lead 192 is cut off. This de-energizes the solenoids of the valves 62 and 147 and the relay 198. The solenoid valves 62 and 147 thereafter route fluid under pressure to their respective cylinders 56 and 142 to urge the roll holder assembly 20 and the rotary cutter 16, respectively, away from the toweling roll 14.

Relieved from the constraint of the roll holder assembly 20 and the rotary cutter 16, the toweling roll 14 may be removed by the operator. If desired, the spring rate of the spring 172 of the locator assembly 18 may be sufficient to eject or outwardly move the toweling roll 14, tumbling it out of the predetermined cutting position to apprise the operator that the cycle of operation is completed, and the toweling roll 14 may be replaced with another roll 14 to be cut.

From the above description it will be apparent that a method and apparatus has been provided for cutting a groove in one end of an elongated hollow cored roll of toweling, which apparatus and method employ a unique means for evacuating the toweling cuttings from the cutter by drawing air through the hollow core of the toweling roll and past the cutter teeth, thereby also cooling the cutter teeth. It will also be apparent that the present apparatus 10 is substantially automatic in operation, the placement of the roll of toweling in position for cutting and the final removal thereof being the only operations required of an attendant. The apparatus 10 is relatively inexpensive to manufacture and simple to operate, and facilitates the formation of the desired groove 12 in a manner not hitherto possible.

While the invention has been described by means of a specific example and a specific embodiment, the invention is not limited thereto since obvious modifications and variations will occur to those skilled in the art without departing from the spirit and scope of the invention as defined by the appended claims.

I claim:

1. In an apparatus for cutting an annular groove in an end of a hollow cored roll of toweling the combination of: a support for said roll having an opening in communication with the hollow core of said roll; a rotary cutter operative through said opening for cutting said groove, said cutter being spaced from the edge margins of said opening to define a clearance space therewith, said cutter having open channels affording communication between said hollow core and said opening; and means for moving air through said hollow core, said open channels, and said opening to evacuate toweling cuttings away from said cutter.

2. In an apparatus for cutting an annular groove in an end of a hollow cored roll of toweling, the combination of: a support for said roll having an opening in communication with the hollow core of said roll; an enclosure forming with said support a hollow evacuation chamber; a rotary cutter located in said evacuation chamber and operative through said opening for cutting said groove, said cutter being spaced from the edge margins of said opening to define a clearance space therewith, said cutter incorporating open channels affording communication between said hollow core and said clearance space; and blower means for withdrawing air from said evacuation chamber to thereby evacuate toweling cuttings away from said cutter, through said open channels, said opening, and out of said evacuation chamber.

3. In an apparatus for cutting an annular groove in an end of a hollow cored roll of toweling, the combination comprising: a support for said roll having an opening; a rotary cutter movable within said opening into and out of engagement with said roll, said cutter being discontinuous in the plane of rotation thereof to provide open spaces; cutter locating means operative to move said cutter into said engagement with said roll; roll locating means supported for engagement by said roll to locate the hollow core thereof in a predetermined position for communication with said opening; roll holding means movable into and out of engagement with said roll, and including a ported element receivable within the hollow core of said roll to hold said roll in said predetermined position and against said support; positioning means operative to move said roll holding means into engagement with said roll; drive means for rotating said cutter; a first switch carried by said roll locating means and engageable with said roll in said predetermined position to effect operation of said positioning means to move said roll holding means into engagement with said roll; a second switch carried by said roll holding means and engageable with said roll when said roll holding means are in engagement with said roll to effect operation of said cutter locating means to move said cutter into engagement with said roll; means for urging air through said ported element, through said hollow core, and through said open spaces to evacuate the toweling cuttings away from said cutter; and a third switch carried by said support and actuable upon completion of the formation of said annular groove to render inoperative said positioning means and said cutter locating means to effect disengagement between said roll and said cutter and said roll holding means.

4. In an apparatus for cutting an annular groove in one end of an elongated, hollow cored roll of toweling, said combination comprising: a frame including a horizontally disposed support for said roll, said support having an opening therethrough; a rotary cutter supported by said frame beneath said opening, said cutter being discontinuous in the plane of rotation thereof to provide open spaces; a lower fluid actuated cylinder connected to a source of fluid under pressure, and including a vertically slidable piston rod connected to said cutter; a locating member supported by said frame and engageable by the periphery of said roll to locate the lower end of the hollow core thereof in a predetermined position upon said support for communication with said opening; a roll holder including a ported element receivable within the upper end of said hollow core to hold said roll in said predetermined position and against said support; an upper fluid actuated cylinder connected to a source of fluid under pressure and including a vertically movable piston rod connected to said roll holder; drive means for rotating said cutter; a first solenoid valve energizable to direct fluid under pressure into said upper cylinder to drive the piston rod thereof downwardly, and reversible to direct fluid under pressure into said upper cylinder to drive the piston rod thereof upwardly; a second solenoid valve energizable to direct fluid under pressure into said lower cylinder to drive the piston rod thereof upwardly, and reversible to direct fluid under pressure into said lower cylinder to drive the piston rod thereof downwardly; a first switch carried by said locating member and engageable with said roll in said predetermined position to connect a source of electrical energy to said first solenoid valve to energize said first solenoid valve; a second switch carried by said roll holder and engageable with said roll when said roller holder is in engagement with said roll to connect a source of electrical energy to said second solenoid valve to energize said second solenoid valve; means for moving air through said ported element, through said hollow core, through said open spaces, and through said opening in said support to evacuate toweling cuttings away from said cutter; and a third switch carried by said frame in electrical circuit with said first and said second solenoid valves, and actuable upon completion of the formation of said annular groove to disconnect said first and said second solenoid valves from said source of electrical energy to thereby reverse said first and said second solenoid valves.

5. In an apparatus for cutting an annular groove in one end of an elongated, hollow cored roll of toweling, said combination comprising: a frame including a horizontally disposed support for said roll, said support having an opening therethrough, said frame including walls forming with said support an evacuation chamber beneath said opening; a rotary cutter supported by said frame within said evacuation chamber, said cutter being discontinuous in the plane of rotation thereof to provide open spaces; a lower fluid actuated cylinder connected to a source of fluid under pressure, and including a vertically slidable piston rod extending into said evacuation chamber and connected to said cutter; a locating member supported by said frame and engageable by the periphery of said roll to locate the lower end of the hollow core thereof in a predetermined position upon said support for communication with said opening; a roll holder including a ported element receivable within the upper end of said hollow core to hold said roll in said predetermined position and against said support; an upper fluid actuated cylinder connected to a source of fluid under pressure and including a vertically movable piston rod connected to said roll holder; drive means rotating said cutter; a first solenoid valve energizable to direct fluid under pressure into said upper cylinder to drive the piston rod thereof downwardly, and reversible to direct fluid under pressure into said upper cylinder to drive the piston rod thereof upwardly; a second solenoid valve energizable to direct fluid under pressure into said lower cylinder to drive the piston rod thereof upwardly, and reversible to direct fluid under pressure into said lower cylinder to drive the piston rod thereof downwardly; a first switch carried by said locating member and engageable with said roll in said predetermined position to connect a source of electrical energy to said first solenoid valve to energize said first solenoid valve; a second switch carried by said roll holder and engageable with said roll when said roll holder is in engagement with said roll to connect a source of electrical energy to said second solenoid valve to energize said second solenoid valve; means for evacuating air through the channel of said element, through said hollow core, through said open spaces, through said opening in said support, and from said evacuation chamber to evacuate toweling cuttings away from said cutter; and a third switch carried by said frame in electrical circuit with said first and second solenoid valves, and actuable upon completion of the formation of said annular groove to disconnect said first and said second solenoid valves from said source of electrical energy to thereby de-energize said first and said second solenoid valves.

References Cited in the file of this patent

UNITED STATES PATENTS

| | | |
|---|---|---|
| 1,136,646 | Bing | Apr. 20, 1915 |
| 1,285,350 | Palmgren | Nov. 19, 1918 |
| 1,316,236 | Hoffman | Sept. 16, 1919 |
| 1,955,182 | Hall | Apr. 17, 1934 |
| 2,437,668 | Adams | Mar. 16, 1948 |
| 2,646,726 | Fogg | July 28, 1953 |
| 2,661,662 | Hall | Dec. 8, 1953 |
| 2,745,318 | Williams | May 15, 1956 |